United States Patent Office 2,768,186
Patented Oct. 23, 1956

2,768,186

PROCESS FOR PREPARING $\Delta^{8,9}$-7-HYDROXY STEROIDS

Leopold Ruzicka, Hans Heusser, and Oskar Jeger, Zurich, Switzerland, assignors to Ciba Pharmaceutical Products, Inc., Summit, N. J.

No Drawing. Application December 13, 1951, Serial No. 261,587

Claims priority, application Switzerland December 22, 1950

4 Claims. (Cl. 260—397.1)

The present invention is concerned with a new process leading to new compounds which make it possible to synthesize therapeutically active steroids containing oxygen in the 11-position.

The steroids with oxygen in 11-position are of great importance. An important representative of this class of compounds is for example cortisone, $\Delta^4$-3,11,20-trioxo-17$\alpha$,21-dihydroxy-pregnene. The hitherto known processes for the synthetic production of such steroids use as starting materials desoxycholic acid and its derivatives, that is to say compounds which possess a hydroxyl group in 12-position. It has been shown however that the transfer of oxygen from the 12- to the 11-position is a very tedious process requiring several operations. In addition the desoxycholic acid used as starting material is only obtainable in relatively limited quantity, so that for example it is practically impossible to manufacture the cortisone required in therapy in sufficient quantity by this method. A requirement therefore exists for new sources for the manufacture of this medicament. The easily available sterols, such as ergosterol, stigmasterol or sitosterol, but more especially cholesterol, have indeed for many years been important starting materials for the production of sex hormones. They have however hitherto been without importance for the production of compounds with oxygen in the 11-position of the intact steroid structure.

The present invention is based on the observation that by starting from the above mentioned sterols or conversion products thereof, compounds of the steroid series with oxygen in the 11-position can be obtained when a $\Delta^{7,8;9,11}$-steroid is treated with an agent capable of introducing oxygen, the resultant $\Delta^{7,8}$-9,11-oxido compound is isomerized, following enolization an oxidizing agent is caused to act on the $\Delta^{8,9}$-11-oxo-compound formed, the resultant $\Delta^{8,9}$-7-hydroxy-11-oxo-steroid is treated with a hydrogenating agent and the hydroxy group in 7-position is removed by reduction.

The process is illustrated by the following diagram of partial formulae:

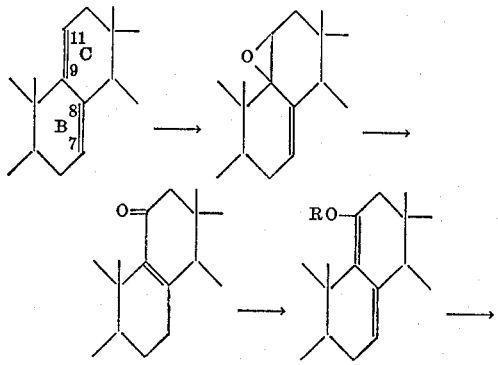

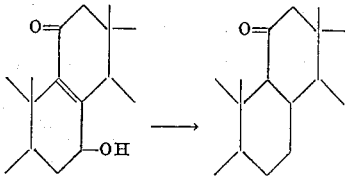

An object of the present invention is $\Delta^{8,9}$-7-hydroxy-11-oxo-steroids. These compounds are new and are intended for use as intermediate products for the preparation of 11-oxo-steroids and 11-hydroxy-steroids. Thus, e. g., the present invention is a step in the preparation of the methyl-3$\alpha$-acetoxy-11-oxo-cholanate (see e. g. Example 5 of copending application S. N. 261,581, filed on even date herewith) which is a recognized and well known intermediate for the production of the highly active hormone 11-dehydro-corticosterone (cf. Wettstein & Meystre: Helv. Chim. Acta, vol. 30, p. 1262–1265 (1947)). Another object of the invention is a process for the manufacture of $\Delta^{8,9}$-7-hydroxy-11-oxo-steroids. It comprises the reaction of peracids with $\Delta^{7,8;9,11}$-enol derivatives of $\Delta^{8,9}$-11-oxo-steroids.

The aforementioned starting materials belong to the cyclopentanopolyhydrophenanthrene or the polyhydrochrysene series. Particular importance is attached to the derivatives of cholestane, coprostane, sitostane, stigmastane, cholane, allocholane, pregnane, androstane and etiocholane. In addition to the aforementioned double bonds, the starting materials may have other double bonds. Where any double bonds are reactive these are suitably protected before the oxidation step of the process, for example by attachment of halogen or hydrogen halide. For the protection of the 5,6-double bond, $\Delta^{5,6}$-steroids may be converted into i-steroids. The $\Delta^{8,9}$-11-oxo-steroids required for the preparation of the enol derivatives can be obtained according to copending U. S. patent application Serial No. 261,586, filed December 13, 1951, by isomerizing $\Delta^{7,8}$-9,11-oxido-steroids with boron trifluoride or ferric chloride. The enol derivatives, such as enol esters or enol ethers, e. g. enol acetate or enol methyl-ether can be prepared by known methods.

For the oxidation according to the invention, peracids are used, in particular monoperphthalic acid or perbenzoic acid. The oxidation is carried out in the presence of a diluent, such as an organic solvent, e. g. a halogenated hydrocarbon.

The following examples illustrate the invention, the relation between parts by weight and parts by volume being the same as that between the gram and the cubic centimeter:

*Example 1*

1 part by volume of $\Delta^{8,9;22,23}$-3$\beta$-acetoxy-11-oxo-ergostadiene of melting point 122–123° (prepared according to U. S. patent application Serial No. 261,586, filed December 13, 1951, is dissolved in 125 parts by volume of acetic anhydride and 0.1 part by weight of p-toluenesulfonic acid added. The reaction mixture is then heated and kept at such a temperature as to allow 20 parts by volume of solvent to distil off within 6 hours. At the end of this time all the solvent is removed at 100° C. in vacuo. The amorphous residue is taken up in 50 parts by volume of absolute ether, cooled to 0° C. and 6 parts by volume of an ethereal solution of monoperphthalic acid (containing 0.008 part by weight of active oxygen per part by volume) are added. The solution is kept at 0° C. for 24 hours and then at 20° C. for 6 days. It is then worked up by diluting with 100 parts by volume of ether and by washing with water, sodium bicarbonate solution and again with water and drying, and evaporating the ether solution. By recrystallization of the crude product $\Delta^{8,9;22,23}$-3$\beta$-acetoxy-7-hydroxy-11-oxo-ergostadiene is obtained, which shows in the ultraviolet spectrum a strong absorption maximum at 252mµ (log ε=3.97). In the infra-red absorption spectrum there are present at 3400 cm.$^{-1}$ the characteristic band of an unesterified hydroxyl group, at 1730 cm.$^{-1}$ the absorption band of the 3-acetoxy group and at 1660 cm.$^{-1}$ the band of the $\alpha,\beta$-unsaturated 11-ketone.

Example 2

1.8 parts by weight of $\Delta^{8,9}$-3$\beta$,20-diacetoxy-11-oxo-allo-pregnene (prepared according to U. S. patent application Serial No. 261,586, filed December 13, 1951) are suspended in a mixture of 2.0 parts by volume of ethyl orthoformate, 0.1 part by volume of ethanol and 15 parts by volume of anhydrous dioxane and treated with 0.5 part by volume of dioxane containing 0.025 part by volume of concentrated sulfuric acid and promptly swirled about to effect a clear solution. This is kept at room temperature for 30 minutes, when one part by volume of pyridine is added, and then concentrated in vacuo to a sirup. The product is once recrystallized from methanol with addition of a few drops of water. The crude, dry enol ether is taken up in 100 parts by volume of anhydrous ether, cooled to 0° C. and treated with 10 parts by volume of an ethereal solution of monoperphthalic acid (containing 0.008 part by weight of active oxygen per part by volume). The reaction mixture is kept at 0° C. for one day, then at 20° C. for 6 days and worked up exactly as described in Example 1. By recrystallization from methanol or from a mixture of acetone and water $\Delta^{8,9}$-3$\beta$,20-diacetoxy-7-hydroxy-11-oxo-allo-pregnene is obtained. It shows in the ultraviolet absorption spectrum a maximum at 252mµ (log ε=3.98). In the infra-red spectrum it shows definite peaks at 3400, 1730 and 1660 cm.$^{-1}$, which are assigned to the hydroxyl-, acetoxy- and $\alpha,\beta$-unsaturated oxo-group.

Example 3

0.5 part by weight of methyl $\Delta^{8,9}$-3$\alpha$-acetoxy-11-oxo-cholenate (prepared according to U. S. patent application Serial No. 261,586, filed December 13, 1951) is dissolved in 2.5 parts by volume of iso-propenyl-acetate, 0.01 part by volume of concentrated sulfuric acid added and the mixture refluxed for 2 hours. At the end of the first hour the pressure is reduced for a short period and 0.7 part by volume of liquid distilled from the solution. At the end of the second hour 0.1 part by weight of anhydrous sodium acetate is added and the mixture concentrated at reduced pressure. The residual mass is treated with 20 parts by volume of chloroform, the solution filtered from sodium acetate, washed with 5 parts by volume of water, dried and evaporated. The crude product is taken up in ether and treated with an ethereal solution of monoperphthalic acid, containing 1.1 equivalents of active oxygen exactly as described in Examples 1 and 2 and worked up in an analogous manner. The product thus obtained can be recrystallized from a mixture of ether and hexane or acetone and water and consists of methyl $\Delta^{8,9}$-3$\alpha$-acetoxy-7-hydroxy-11-oxo-cholenate. In the ultraviolet spectrum it shows the typical absorption at 252 mµ (log ε=4.0).

By treating $\Delta^{8,9}$-3$\beta$-acetoxy-11-oxo-cholestene, $\Delta^{8,9:22,23}$-3$\beta$-acetoxy-11-oxo-stigmastadiene or $\Delta^{8,9}$-3$\beta$,17$\beta$-diacetoxy-androstene in an analogous way the corresponding $\Delta^{8,9}$-7-hydroxy-11-oxo-steroids are obtained.

What is claimed is:

1. A process for the conversion of a member selected from the group consisting of $\Delta^{8,9}$-3-lower alkylcarbonyloxy-11-oxo-ergostadienes, $\Delta^{8,9}$-3-lower alkylcarbonyloxy-11-oxo-allo-pregnenes, $\Delta^{8,9}$-3-lower alkylcarbonyloxy-11-oxo-cholenes, $\Delta^{8,9}$-3-lower alkylcarbonyloxy-11-oxo-cholestenes, $\Delta^{8,9}$-3-lower alkylcarbonyloxy-11-oxo-stigmastadienes and $\Delta^{8,9}$-3-lower alkylcarbonyloxy-11-oxo-androstenes to the corresponding 3-lower alkylcarbonyloxy-7-hydroxy-11-oxo-compound, which comprises subjecting the said member of the said group to the action of a peracid.

2. A process for the conversion of a lower alkyl $\Delta^{8,9}$-3-lower alkylcarbonyloxy-11-oxo-cholenate to the corresponding lower alkyl $\Delta^{8,9}$-3-lower alkylcarbonyloxy-7-hydroxy-11-oxo-cholenate, which comprises subjecting the lower alkyl $\Delta^{8,9}$-3-lower alkylcarbonyloxy-11-oxo-cholenate to the action of a peracid.

3. A process for the conversion of a lower alkyl $\Delta^{8,9}$-3-acetoxy-11-oxo-cholenate to the corresponding lower alkyl $\Delta^{8,9}$-3-acetoxy-7-hydroxy-11-oxo-cholenate, which comprises subjecting the lower alkyl $\Delta^{8,9}$-3-acetoxy-11-oxo-cholenate to the action of monoperphthalic acid.

4. A process for the conversion of methyl $\Delta^{8,9}$-3-3$\alpha$-acetoxy-11-oxo-cholenate to the corresponding methyl $\Delta^{8,9}$-3$\alpha$-acetoxy-7-hydroxy-11-oxo-cholenate, which comprises subjecting the methyl $\Delta^{8,9}$-3$\alpha$-acetoxy-11-oxo-cholenate to the action of monoperphthalic acid.

References Cited in the file of this patent

UNITED STATES PATENTS 2,545,978    Stavely _____ Mar. 20, 1951

OTHER REFERENCES

Fieser et al.: Natural Products Related to Phenanthrene, 3rd ed., page 425 (1949).